United States Patent [19]

Kuhn

[11] 4,204,609
[45] May 27, 1980

[54] COOKING, SERVING AND WARM-KEEPING ARRANGEMENT

[75] Inventor: Jacques Kuhn, Rikon, Switzerland

[73] Assignee: Heinrich Kuhn Metallwarenfabrik Aktiengesellschaft, Rikon, Switzerland

[21] Appl. No.: 869,492

[22] Filed: Jan. 16, 1978

[30] Foreign Application Priority Data

Jan. 26, 1977 [CH] Switzerland ............................ 955/77

[51] Int. Cl.² ...................... B65D 21/02; A47J 36/06; A47J 39/02
[52] U.S. Cl. .................................... 220/408; 206/508; 206/514; 220/74; 220/428; 220/215
[58] Field of Search ................ 206/508, 514; 220/408, 220/428, 215, 74

[56] References Cited

U.S. PATENT DOCUMENTS

| 933,136 | 9/1909 | Sternau | 220/428 |
|---|---|---|---|
| 1,091,903 | 3/1914 | Wojdikow | 220/428 |
| 1,268,017 | 5/1918 | Knight | 220/428 |
| 1,330,868 | 2/1920 | Harrison | 220/428 |
| 1,361,364 | 12/1920 | Burlingham | 220/408 |
| 2,011,752 | 9/1935 | Christman | 220/74 |
| 2,298,814 | 10/1942 | Weis | 206/508 |
| 2,963,197 | 12/1960 | Lyon | 220/74 |

FOREIGN PATENT DOCUMENTS

| 685567 | 12/1939 | Fed. Rep. of Germany | 206/514 |
|---|---|---|---|
| 1050399 | 1/1954 | France | 206/514 |
| 211063 | 2/1924 | United Kingdom | 206/514 |

Primary Examiner—George E. Lowrance
Attorney, Agent, or Firm—Weiser, Stapler & Spivak

[57] ABSTRACT

Handleless cooking vessel nestable inside a serving vessel. The former has a broad grasping rim resting upon a bulge in the rim of the latter. It is also adapted to be closed by a lid, preferbly with step-like junction to the vessel. A plurality of units of cooking and serving vessels, nestable within each other during non-use.

12 Claims, 3 Drawing Figures

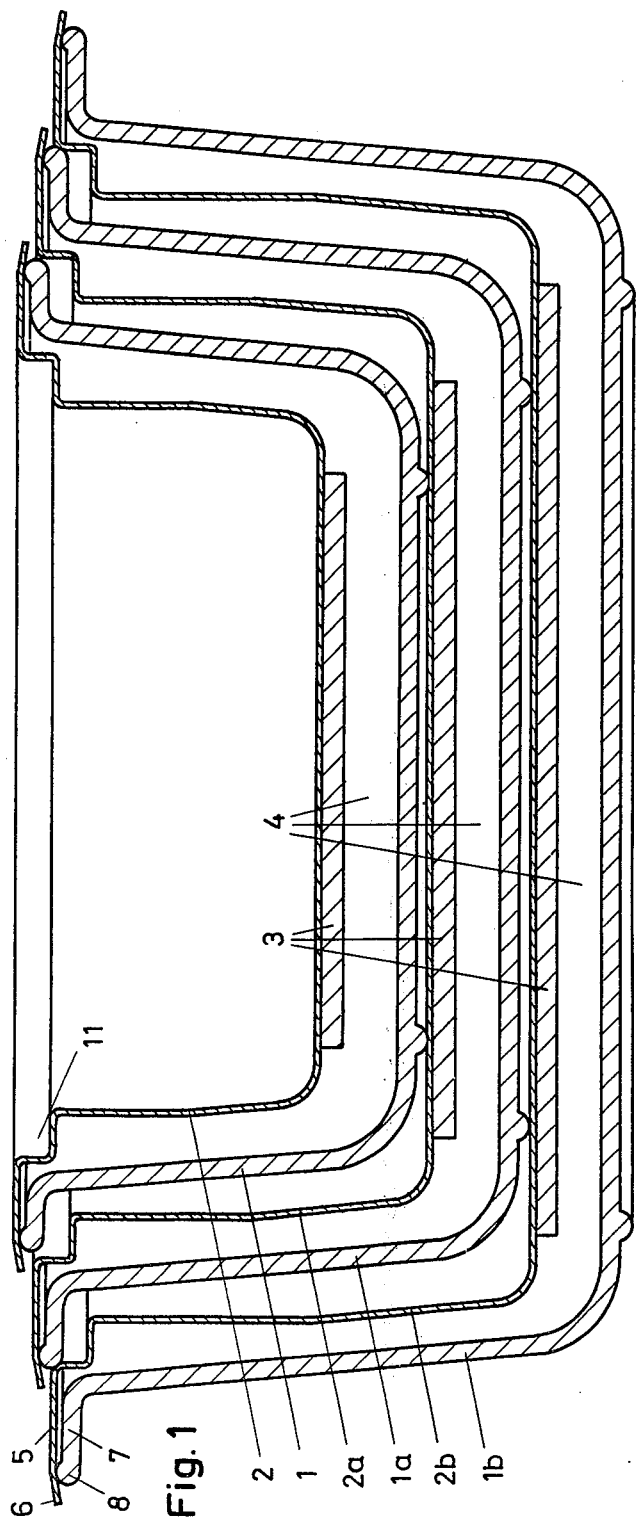
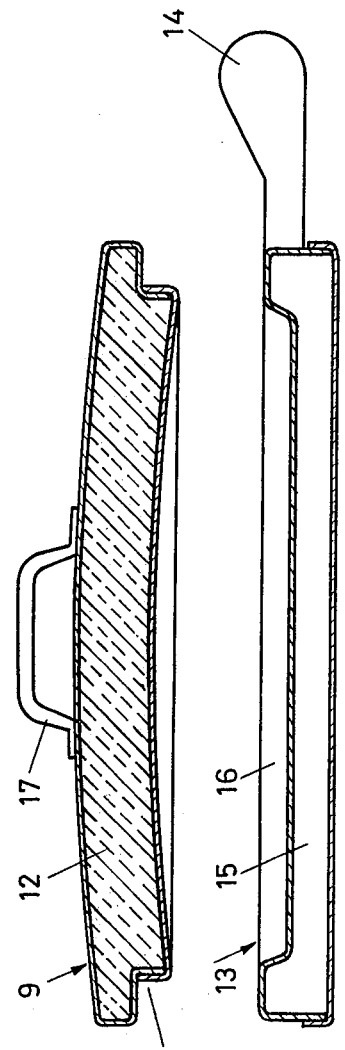
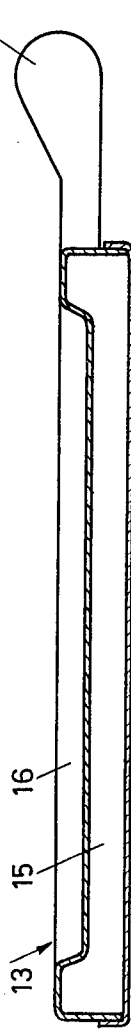
Fig. 1
Fig. 2
Fig. 3

COOKING, SERVING AND WARM-KEEPING ARRANGEMENT

For the cooking of meals, there are used cooking vessels which have heat conducting bottoms for electrical, coal or gas heating. Because these cooking vessels are normally not suitable for the presentation of dishes, separate containers and platters are needed for serving upon which the cooked dishes must be arranged before being served, which is undesirable. Moreover, warm-keeping of the dishes is not achieved either in the cooking vessels removed from their heat source or in the serving containers or platters.

For warm-keeping of cooked food special containers must be provided, for example thermos containers with evacuated spaces.

It is an object of the invention to eliminate these drawbacks and to provide a simple cooking, serving and warm-keeping arrangement in which it is possible to provide rapid and uniform heating of the cooked food, as well as warm-keeping of the dishes over an extended period of time. This arrangement should be such that it can also be used to serve the cooked food and that the containers of the arrangement can be nested within each other in space-saving manner.

The last named requirement cannot be realized with known cooking vessels because they are provided with grips and handles which make it impossible to nest them within each other in space-saving manner.

The object is achieved in accordance with the invention by providing the arrangement with at least one unit consisting of a serving container and a cooking container inserted therein. Between these two containers a heat insulating space is provided and the cooking vessel is adapted to be closed by a heat insulating lid.

In a preferred embodiment of the invention the grip- and handle-free cooking vessel has a broad grasping rim. It rests with this rim upon an outer, ring shaped bulge in the rim of the serving vessel, the lower surface of the latter being adapted to support the entire cooking vessel/serving vessel unit.

In what follows, illustrative examples of the invention are further described with reference to the drawings. These show:

FIG. 1, a cross section through a stack of cooking and serving vessels nested within one another, in which each serving vessel and the cooking vessel inserted therein constitute a unit, FIG. 2, a cross section through an insulating lid for a cooking vessel, and FIG. 3, a cross section through an insulating flat lid upon which a container can be placed.

The cooking, serving and warm-keeping arrangement illustrated in FIG. 1 includes three separate units, consisting respectively each of a serving vessel 1, 1a, 1b and a cooking vessel 2, 2a, 2b, which is inserted or nested within the corresponding serving vessel.

The units 1, 2; 1a, 2a; 1b, 2b differ only in their sizes, which makes it possible by virtue of the size differences to nest the individual units in space saving manner during non-use. The arrangement could of course include a different number of units. In the discussion which follows reference will be made only to the first unit 1, 2 because all units are similar to one another.

The cooking vessel 2, for example made of aluminum or stainless steel, has a heat conducting bottom 3 which insures rapid and uniform heating of the cooked food. The wall of the vessel is also heat conducting but it could also be insulated. The cooking vessel 2 has no hand grip, however the rim 5 is made specially wide, so that the vessel can be manually grasped at the outer edge 6 of rim 5 in order to remove it from the heat and place it within serving vessel 1. Because of the width of grasping rim 5 the outer edge becomes only slightly heated and can be grasped without difficulty. The serving vessel may, for example, be made of steel, of synthetic plastic, or of a ceramic material and may be made with or without insulation.

The rim 7 of serving vessel 2 is also wide and has an outer ring-shaped bulge 8 which serves a bearing surface for the outer edge of rim 5 of cooking vessel 1. This creates a hollow space 4 between the cooking vessel 1 and the serving vessel 2 which has excellent insulating effect and provides for extended warm-keeping of the cooked food.

Because the two vessel rims 5, 7 contact each other only along a line, and at the outermost diameter at that, the heat transfer from the hot cooking vessel to the cold serving vessel is very low. Therefore, the rim 7 of the serving vessel is only slightly heated even for very hot cooked food. Consequently, the cooking vessel/serving vessel unit may be grasped at the lower rim surface of the serving vessel and so carried.

To further improve the warm-keeping of the cooked food, a heat insulating lid 9 may be provided whose rim portion 10 is formed in two steps and fits upon a correspondingly shaped rim portion 11 of the cooking vessel. In the closing region there is thus created a ring shaped intermediate zone where condensate water can form and collect. This provides an additional sealing effect between the cooking vessel and the lid. The lid 9 may be filled with insulating material 12 and may have a carrying handle of known type, it being necessary to insulate this handle. It may also be desirable to secure the lid to the cooking vessel by means of a curved handle.

The cooking, serving and warm-keeping arrangement described may be used not only in the household but also in institutions such as hospitals, canteens, hotels and restaurants. In such case, it is desirable to provide a flat lid 13 with handle 14 as shown in FIG. 3. Such a flat lid 13 may also be doubled walled and have within it an insulating hollow space 15.

Into upper recess 16 additional pots or vessels may then be placed.

The above described cooking, serving and warm-keeping arrangement provides the following advantages:

Rapid cooking onset of the cooked food in the separated cooking vessel. Because the lid is well insulated and has a two step, sealed closure whose sealing effect is further improved by condensate water, a minimum of heat is lost even during the initial start up of cooking and during the actual cooking process. Steam loss is also avoided which is particularly desirable for the slow cooking and steaming of foods in their own juices.

As soon as the cooking process is terminated the cooking vessel is placed within the serving vessel kept ready for that purpose and is brought to the table without having to first distribute the food upon separate platters.

Due to the good heat insulation no special warm-keeping arrangements such as hot plates and the like need be used. This is particularly important in serving food or beverages outdoors or when there are long transport distances.

Due to elimination of separate serving containers and warm-keeping arrangements the service in institutions is simplified.

The individiual vessels are so dimensioned relative to each other that they are capable of being placed inside each other in space saving manner while not being used.

Through provision of an especially broad grasping rim, grips and handles become superfluous. Only this makes it possible to insert the cooking vessels into the serving vessels in a manner which closes an insulating space. The grasping rim may, for example, be about 25 mm wide and may be bent slightly downwardly at the outer end. This also prevents cooking food, when boiling over, from flowing downwardly along the pot wall and reaching the cooking surface or the gas flame. In this respect, therefore, this may be considered as a safety rim. Handleless cooking vessels are also safer, especially when children are present in the kitchen, who may bump during play against outwardly protruding handles. Also, handleless vessels take up less space in the dishwasher.

Through use of flat lids it is also possible to stack the vessels on top of each other for serving.

I claim:

1. Cooking, serving and warm-keeping arrangement which includes at least one unit consisting of a serving vessel and a cooking vessel adapted to be nested therein,
    the cooking vessel being adapted to be closed by a heat insulating lid,
    the serving vessel having a generally horizontally outward extending encircling rim provided with an upward extending encircling bulge at a substantial distance out along its width and substantially at the outward edge of said rim,
    the cooking vessel also having a generally horizontally outward extending encircling rim wide enough to extend beyond said bulge, the top of said upward extending encircling bulge forming substantially a line contact with and the only support for the cooking vessel which is so shaped and dimensioned as to otherwise be freely suspended within the serving vessel,
    whereby a heat insulating space is provided interiorly of said bulge between the nested cooking and serving vessels including between their generally horizontal rims.

2. The arrangement of claim 1 having a plurality of units of different sizes and nestable within each other.

3. The arrangement of claim 1 wherein the cooking vessel is free of grips or handles and is provided with a broad grasping rim curved downwardly at the outer end.

4. The arrangement of claim 3 wherein the broad grasping rim extends away from the cooking vessel wall sufficiently to cause overflowing cooked food to drip down outside a cooking surface or gas flame.

5. The arrangement of claim 3 wherein the bottom of the serving vessel supports the entire cooking vessel/serving vessel unit.

6. The arrangement of claim 1 further having a heat insulating lid and wherein the lid is provided with at least one non-insulating handle.

7. The arrangement of claim 1 further having a heat insulating lid and a flat lid having an upper recess adapted to permit stacking of the units when the lid is in place upon the cooking vessel to be covered thereby.

8. The arrangement of claim 1 further having a heat insulating lid and wherein the lid rim and the corresponding portion of the cooking vessel rim are provided with a plurality of mating steps.

9. The arrangement of claim 1 further comprising a heat insulating lid and wherein means are provided for detachably fastening the lid to the cooking vessel.

10. The arrangement of claim 1 wherein the space between vessels is filled only with air when the nested vessels are in use.

11. The arrangement of claim 1 wherein the rim of the cooking vessel extends outwardly beyond the outer edge of the rim of the serving vessel.

12. The vessel of claim 1 wherein the cooking vessel has an encircling downward step inside its rim for receiving the lid.

* * * * *